Aug. 30, 1966   E. N. FIRTH ET AL   3,269,183
WELL WATER LEVEL INDICATOR
Filed Feb. 24, 1964

INVENTORS
EDMUND N. FIRTH
JAMES E. NEZWORSKI
ORVAL E. JACOBSEN
BY
Miles Henninger
ATTORNEY United States Patent Office 3,269,183
Patented August 30, 1966

3,269,183
WELL WATER LEVEL INDICATOR
Edmund N. Firth and James E. Nezworski, New Berlin, and Orval E. Jacobsen, Brookfield, Wis.
Filed Feb. 24, 1964, Ser. No. 346,802
2 Claims. (Cl. 73—299)

This invention relates to improvements in means for indicating variation in the level of water in a well or the like, at a location remote from the water level.

The users of drilled wells and the like desire to keep themselves accurately informed as to the level of water in a well under all conditions of water usage and atmospheric conditions. Such information is particularly important where many wells extend into the same aquifer strata and when heavy usage is required of many wells. The means employed should be hydraulically and mechanically so simple that the device may be installed personally and used by most persons and so that the device can be simply checked to determine that it is in operating condition. Further, the condition controlling the accuracy must be measurable by a user within the limits required by the device.

The above requirements are best fulfilled if a tubular member of at least two different internal diameters extends into the water in the well for a relatively short distance and is connected at its upper end to a pressure or a pressure-vacuum responsive gauge. The tubular member comprises a rigid end part of relatively large internal diameter to enclose a relatively large volume of air and which has a weight at least slightly greater than the water it displaces. A tube of relatively small internal diameter is connected at one end in air tight relation to the rigid tube and connected at the other end to the gauge so that it retains a volume of air in a particular ratio to that of the rigid tube. The small tube is flexible but sufficiently strong walled to resist pressure variations acting either inside or outside the flexible tube. We have determined that our device has accuracy more than adequate for its use so long as the joints between parts are substantially air tight and the gauge has good commercial accuracy, and, most important, that the volumetric ratio of the rigid tube to the flexible tube is not greater than 1:6.

Figure 1:
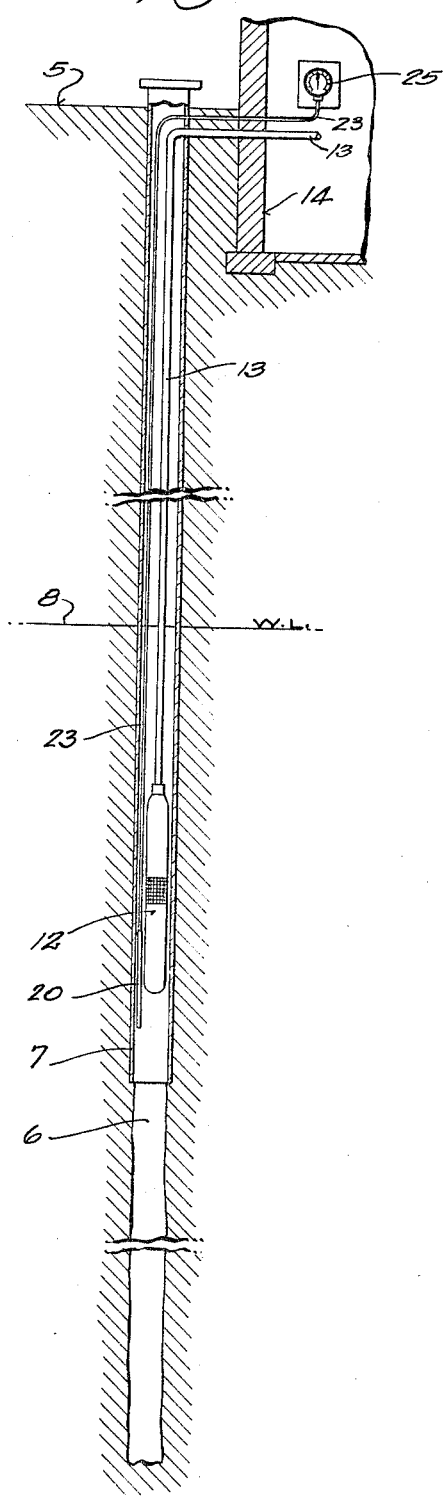
Figure 2:
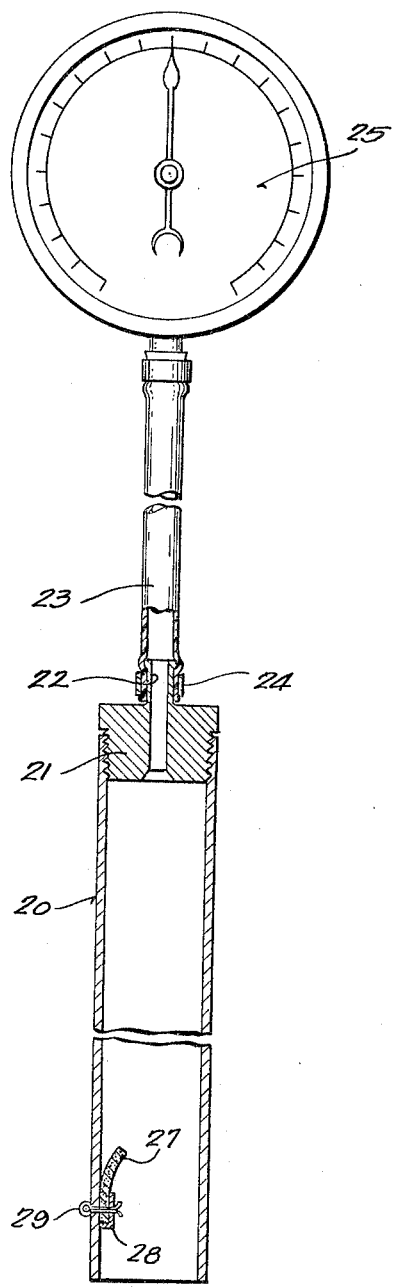

In the accompanying drawings:

FIG. 1 diagrammatically represents a drilled well having a part of its depth encased or lined for receiving a known type of submersible type pump and motor or jet type pump having a discharge pipe to the surface of the ground, and FIG. 2 is an enlarged illustration of a rigid tube connected with a flexible tube which is connected to a gauge for indicating pressure variations within the tube.

Referring specifically to the drawings, numeral 5 indicates the surface of the ground into which is drilled a well 6 having a casing or lining 7 at least for a part of the well depth from the ground surface, the casing preferably extending a substantial distance below the usual water level 8 in the well. The well contains a submersible pump and motor 12 or other pump having a discharge pipe 13 extending from the well into a building 14 to which water is to be supplied.

The water level in the well is indicated at a location remote from such level by means including a rigid tube 20 having an air-tight fitting in one end to provide a plug portion 21 and a nozzle portion 22. The rigid tube must be of an outside diameter which will pass readily between the casing 7 and the pump-motor 12 and is of the length to contain a substantial volume of air when the rigid tube is immersed in the water. We have found that a rigid tube of non-corrosive metal of not less than 1 inch internal diameter and not less than 15 inches length is adequate when we have a total length of no more than 200 feet of tubular member with the smaller tubular member of particular internal diameter.

To the rigid tube nozzle 22 is attached a flexible and preferably slightly resilient tube 23 which is held in place thereon by a clamp 24. The flexible tube may be of an internal diameter of a relatively small fraction of that of the rigid tube and of the length to extend from the water level 8 to wherever a pressure gauge 25 is to be mounted at the well head or remotely therefrom. We have found that a polyethylene tube having an internal diameter of $3/16$ inch and a wall thickness of .062 inch is very satisfactory in service with a rigid tube of the above dimensions as long as the flexible tube is not longer than 200 feet (i.e. volume ratio of rigid tube to flexible tube is not greater than 1:6). A smaller flexible tube may also be used so long as the air pressure variations are transmitted freely.

The present device is installed in either of two ways:

(1) The flexible tube 23 is attached to the Bourdon type gauge 25 and to the rigid tube 20, and is installed simply by dropping the rigid tube into the well until it is completely immersed in the water, preferably to a minimum depth of fifteen feet below the water level. The scale of the gauge, in this installation, runs from zero at the lefthand end to fifteen pounds maximum at the righthand end.

(2) The device is installed by attaching flexible tube 23 to the rigid tube 20, and dropping into the well until the rigid tube is immersed to the depth of approximately fifteen feet below the water level. The flexible tube 23 is then firmly affixed to Bourdon gauge 25. The scale of the gauge in this installation, preferably runs from zero in a central position to increasing numbers at both sides of the zero. The gauge pointer will then move from zero toward the left with any fall in the water level producing a partial vacuum and will move from zero toward the right upon any rise in the water level.

To reduce absorption of air by water, a small wick of absorbent material 27 is lightly saturated with a non-volatile sterile oil which, on installation, provides a microfilm of oil across the top of the water level in the rigid tube 20. The wick is retained in a holder 28 by a removable pin 29.

If there should be any question as to whether the air originally present within the tube remains at the same volume or not, the accuracy of the gauge reading can be quickly checked by merely raising the rigid tube above the water level and momentarily venting the gauge end of the flexible tube and then dropping it into its original position within the water. To recalibrate the gauge to the vacuum-pressure system, vent at the gauge end of the flexible tubing, which returns the gauge to a zero setting at current water level. No other maintenance is necessary to keep the device in operating condition so long as the parts are not themselves damaged.

We claim:

1. A device for remote indication of variation in the relative water level in a well and comprising a rigid tube for immersion in the water in the well, a flexible tube connected at one end with an end of the rigid tube in substantially airtight relation thereto, said flexible tube having an inside diameter smaller than the inside diameter of the rigid tube, said rigid tube having an unobstructed opening at its lower end through which water may enter and leave, and a gauge connected in substantially airtight relation with the other end of the flexible tube for mounting at a location remote from the water level for indicating increase and decrease in pressure within the tubes as the water level rises and drops respectively in the rigid tube, the ratio of air volume within the rigid tube to the air volume within the flexible tube being no more than 1:6, the wall of the flexible tube being sufficiently thick to be unaffected by air pressure variation within and without said tube, the portion of said device mounted within said well consisting solely of said rigid tube and said flexible tube, the air within said device coming solely from atmospheric air trapped within said tubes when said device is placed in a well, and means mounted inside the rigid tube for delivering oil upon contact with water and thereby spreading a film of oil over the water surface within said surface, said means consisting of an absorbent body within the rigid tube, said absorbent body containing a substantially non-volatile substance capable of forming a film on the surface of a body of water.

2. The indicating device of claim 1 in which said substance in said absorbent body is a non-volatile oil.

References Cited by the Examiner

UNITED STATES PATENTS

| | | | |
|---|---|---|---|
| 804,570 | 11/1905 | Wheeler | 73—300 |
| 2,360,742 | 10/1944 | Toth et al. | 73—302 X |
| 2,664,750 | 1/1954 | McCrink | 73—299 X |

FOREIGN PATENTS 731,092  2/1943  Germany.

LOUIS R. PRINCE, *Primary Examiner.*

ISAAC LISANN, F. H. THOMSON,
*Assistant Examiners.*